United States Patent
Yam (10) Patent No.: US 9,154,427 B2
(45) Date of Patent: Oct. 6, 2015

(54) ADAPTIVE RECEIVE PATH LEARNING TO FACILITATE COMBINING TCP OFFLOADING AND NETWORK ADAPTER TEAMING

(71) Applicant: EMULEX DESIGN AND MANUFACTURING, Costa Mesa, CA (US)

(72) Inventor: Wilson Kwong Thai Yam, Tustin, CA (US)

(73) Assignee: EMULEX CORPORATION, Costa Mesa, CA (US)

( * ) Notice: Subject to any disclaimer, the term of this patent is extended or adjusted under 35 U.S.C. 154(b) by 164 days.

(21) Appl. No.: 13/732,370

(22) Filed: Dec. 31, 2012

(65) Prior Publication Data

US 2014/0185623 A1    Jul. 3, 2014

(51) Int. Cl.
*H04L 12/801* (2013.01)
*H04L 12/919* (2013.01)
*H04L 12/891* (2013.01)

(52) U.S. Cl.
CPC .............. *H04L 47/193* (2013.01); *H04L 47/41* (2013.01); *H04L 47/765* (2013.01)

(58) Field of Classification Search
None
See application file for complete search history.

(56) References Cited

U.S. PATENT DOCUMENTS 6,567,377 B1 * 5/2003 Vepa et al. .................... 370/230
8,285,881 B2 * 10/2012 Elzur ............................. 709/250
2003/0140124 A1 * 7/2003 Burns .......................... 709/220
2003/0147385 A1 * 8/2003 Montalvo et al. ............. 370/389
2013/0148546 A1 * 6/2013 Eisenhauer et al. .......... 370/255

OTHER PUBLICATIONS

Broadcam NetXtreme User Guide.pdf. Downloaded Dec. 8, 2012 from http://support.dell.com/support/edocs/network/broadcom/r230837/en/teamsvcs.htm pp. 1-31.
"Network Connectivity: How Do I Use Teaming with Advanced Networking Services (ANS)?" Downloaded Dec. 8, 2012 from http://www.intel.com/support/network/sb/cs-009747.htm pp. 1-8.
"Broadcom Gigabit Ethernet Teaming Services: Broadcom NetXtreme II Network Adapter User Guide." Downloaded Dec. 8, 2012 from http://support.dell.com/support/edocs/network/broadcom/r230837/en/teamsvcs.htm pp. 1-31.
"Network Connectivity." intel © downloaded Dec. 8, 2012 from http://www.intel.com/support/network/sb/cs-009747.htm pp. 1-8.

* cited by examiner

*Primary Examiner* — Jason Mattis
(74) *Attorney, Agent, or Firm* — McAndrews, Held & Malloy Ltd.

(57) ABSTRACT

One or more modules include a first portion that teams together multiple physical network interface ports of a computing system to appear as a single virtual network interface port to a switch to which the physical ports are linked. A second portion determines a receive port upon which a packet of a TCP session was received. A third portion assigns a transmit port to be the receive port, wherein the transmit port is used by the computing system to transmit packets of the TCP session. The third portion assigns the transmit port prior to a TCP offload engine (TOE) being enabled to offload from the system CPU processing of packets of the TCP session transceived on the assigned transmit/receive port. If a subsequent packet for the TCP session is received on a different second port, the transmit port is reassigned to be the second port.

20 Claims, 4 Drawing Sheets

ADAPTIVE RECEIVE PATH LEARNING TO FACILITATE COMBINING TCP OFFLOADING AND NETWORK ADAPTER TEAMING

BACKGROUND

There is a constant demand for increased data availability and bandwidth in computer networks. This has driven the development of higher data transmission rates on network links, such as Ethernet links, from the order of tens of megabits per second to hundreds of gigabits per second. However, the migration to these new technologies may be expensive and disruptive to the operation of data centers and users that employ them. An alternative method to increase bandwidth is to logically group multiple network interface ports together so that they appear to clients as a single network interface port, commonly referred to as a virtual network interface port. This practice is commonly referred to as simply teaming, network interface controller (NIC) teaming, link aggregation, link bundling, port trunking and NIC bonding, and is generally referred to herein as network interface adapter teaming, adapter teaming or simply teaming. Another advantage of NIC teaming is increased data availability by supporting failover to a different port of the team if one of the ports fails.

The most widely used suite of networking protocols is the Transmission Control Protocol/Internet Protocol (TCP/IP) suite of protocols. Generally speaking, a TCP segment includes a header and payload that are encapsulated within an IP packet. The IP packet includes a header and payload that are encapsulated within a data link layer packet, such as an Ethernet frame, or packet. Historically, the Ethernet frame is received by the network interface adapter and transferred to the system memory of the host computer, which is a server system in many cases. The network protocol stack of the host operating system, which is executed by the host CPU, then processes the frame according to the various protocol layers. The processing involves: examining various fields of the packet headers; performing error checking by generating checksums of the packet words and comparing the generated checksum with the checksum included in the packet; generating and transmitting acknowledgement packets on the network to acknowledge receipt of the received packets; and establishing connections with remote hosts, which involves processing packets and generating and transmitting packets; among others. For outgoing packets, the host CPU generates the checksums and headers, which includes calculating sequence numbers performing sliding window calculations to accomplish network congestion control. The CPU generates the packets in the system memory, the packets are transferred to the network interface adapter, and the adapter transfers the packet from system memory out of its ports onto the network.

It was found that a significant amount of the CPU bandwidth was being consumed by processing the TCP/IP packets and in some cases causing poor performance of applications running on the host. A solution developed to address this problem was to offload some the TCP/IP processing to the network interface adapter. The portion of the network adapter devoted to this task is commonly referred to as a TCP Offload Engine (TOE). A TOE stores state of a TCP session to enable it to offload the system CPU by performing some or all of the TCP/IP processing. TOEs may also reduce the amount of traffic on the host local bus, such as the Peripheral Component Interconnect (PCI) bus, by alleviating the need for some packets and/or headers to travel from system memory across the PCI bus to the network adapter, such as the acknowledgement packets, which are generated by the TOE which is on the network interface side of the PCI bus rather than the system memory side of the PCI bus.

Unfortunately, the performance benefits enjoyed by separately employing network adapter teaming and separately employing TOEs have been difficult to realize when using the two in combination. This appears to be primarily due to the fact that the network switch to which the individual host network interface adapters are linked may choose to transmit the packets of a TCP session to a different physical port of the virtual adapter than the physical port of the virtual adapter that the host chooses to transmit the packets of the TCP session. That is, the output port selection algorithms (commonly referred to as hashing algorithms) of the network switch and the host may be different. This is problematic because the TOE requires the TCP session state in order to perform its protocol offload functions. This causes the copying of packets within system memory and/or the different network adapters that are receiving the packets and transmitting the packets for the TCP session, which results in wasted system memory, local I/O bus and/or CPU bandwidth and in some cases overall system performance that is worse than obtained without the TOE services. For this reason, major network solution providers have chosen not to support TOE in combination with predominate teaming protocols, such as LACP and IEEE 802.3ad.

Therefore, a solution is needed to improve the performance of a host computer system that combines network adapter teaming and TOEs.

BRIEF SUMMARY

According to the present invention, the host system learns the receive port of the teamed virtual network port for a TCP session and assigns the transmit port for the TCP session to be the receive port. This enables the TOE associated with the port to perform its protocol offloading functions without negatively impacting the overall performance caused by the wasted packet copying of conventional systems.

In one aspect, the present invention provides a method that includes teaming together a plurality of physical network interface ports of a computing system to appear as a single virtual network interface port to a switch having a corresponding plurality of ports to which the plurality of physical ports are linked. The method also includes determining a receive port upon which a packet of a TCP session was received, wherein the receive port is one of the plurality of physical network interface ports of the virtual network interface port. The method also includes assigning a transmit port to be the receive port. The transmit port is used by the computing system to transmit packets of the TCP session. The assigning is performed prior to a Transmission Control Protocol (TCP) offload engine (TOE) of the computing system being enabled to offload from a CPU of the computing system processing of packets of the TCP session transceived on the assigned transmit/receive port.

In another aspect, the present invention provides one or more modules that include a first portion configured to team together a plurality of physical network interface ports of a computing system to appear as a single virtual network interface port to a switch having a corresponding plurality of ports to which the plurality of physical ports are linked. The one or more modules also include a second portion configured to determine a receive port upon which a packet of a TCP session was received, wherein the receive port is one of the plurality of physical network interface ports of the virtual network interface port. The one or more modules also include a third portion configured to assign a transmit port to be the receive port, wherein the transmit port is used by the computing system to transmit packets of the TCP session. The third portion assigns the transmit port to be the receive port prior to a Transmission Control Protocol (TCP) offload engine (TOE) of the computing system being enabled to offload from a CPU of the computing system processing of packets of the TCP session transceived on the assigned transmit/receive port.

In yet another aspect, the present invention provides a computer program product encoded in at least one non-transitory computer usable medium, the computer program product comprising computer usable program code embodied in the medium. The computer usable program code includes first program code for teaming together a plurality of physical network interface ports of a computing system to appear as a single virtual network interface port to a switch having a corresponding plurality of ports to which the plurality of physical ports are linked. The computer usable program code also includes second program code for determining a receive port upon which a packet of a TCP session was received, wherein the receive port is one of the plurality of physical network interface ports of the virtual network interface port. The computer usable program code also includes third program code for assigning a transmit port to be the receive port, wherein the transmit port is used by the computing system to transmit packets of the TCP session. The third program code assigns the transmit port to be the receive port prior to a Transmission Control Protocol (TCP) offload engine (TOE) of the computing system being enabled to offload from a CPU of the computing system processing of packets of the TCP session transceived on the assigned transmit/receive port.

DETAILED DESCRIPTION OF THE EMBODIMENTS

Figure 1:
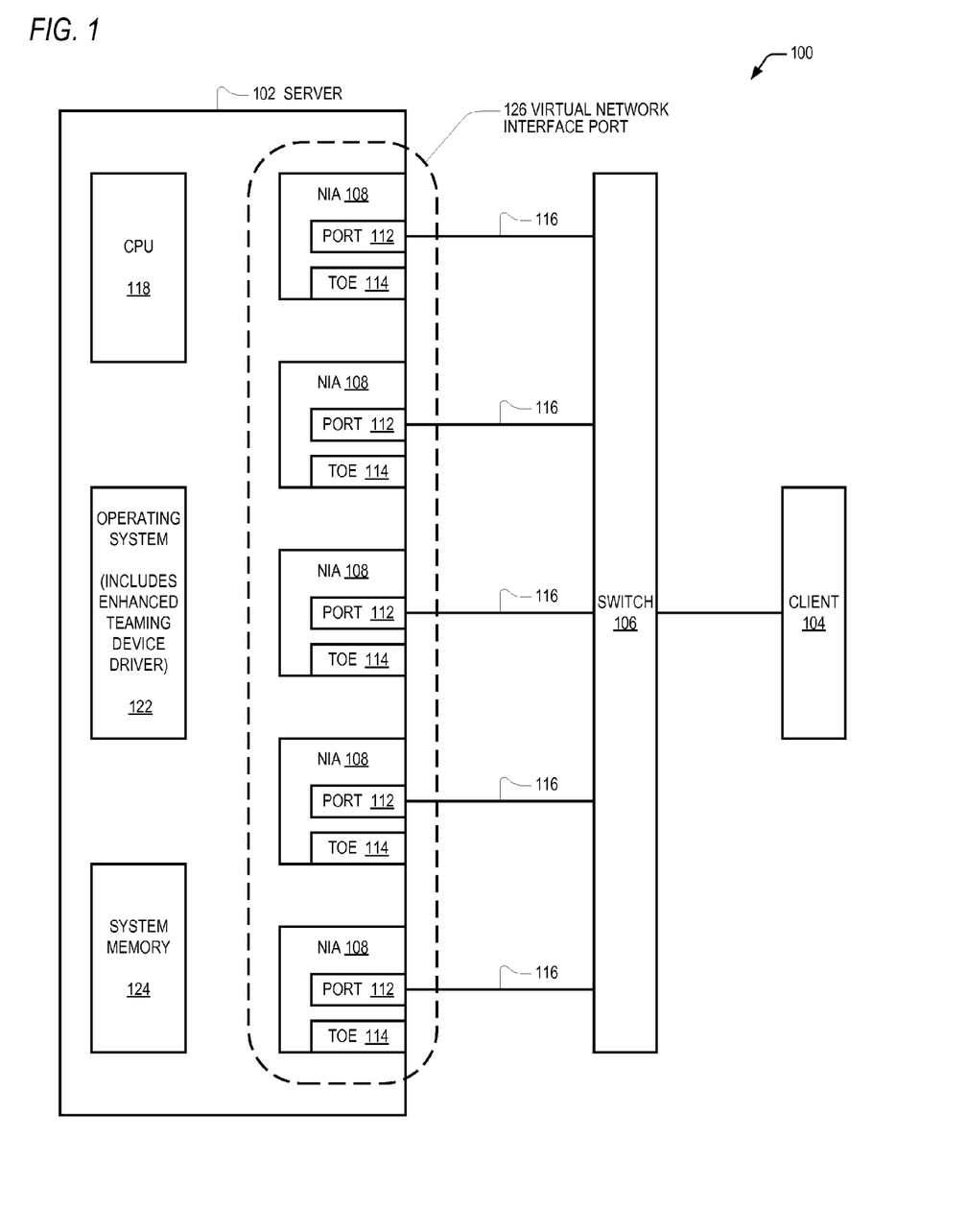
FIG. 1 is a block diagram illustrating a computer network according to the present invention.

Referring now to FIG. 1, a block diagram illustrating a computer network 100 according to the present invention is shown. The network 100 includes a server 102, a client 104 and a switch 106. The server 102 includes a plurality of network interface adapters (NIAs) 108, each of which includes one or more physical ports 112 and a TCP Offload Engine (TOE) 114. A TOE is a portion of a NIA 108 that offloads from the system CPU 118 some or all of the TCP/IP processing associated with packets of a TCP session transmitted and received (transceived) by a physical network interface port 112 of the NIA 108. The TOE stores state of the TCP session to enable it to offload the system CPU. In one embodiment, the NIAs 108 include one TOE 114 per port 112; in other embodiments a single TOE 114 may service multiple ports 112 on the NIA 108. The TOE 114 may be embodied in hardware, software or a combination thereof. The TOE 114 is in communication with the physical port 112 and capable of causing the port 112 to transmit packets. The TOE 114 is also able to read and write local memory of the NIA 108 in order to analyze packets placed in the local memory by the port 112 and to generate packets, or portions thereof, within the local memory for transmission by the port 112 on the link 116 to the switch 106 and eventually to the client 104. A source IP address, a destination IP address, a source port number and a destination port number identify a TCP session. Additionally, each packet of a TCP session has a unique sequence number to distinguish it from other packets of a TCP session and identify the data contained in the packet payload. A TCP session is also referred to as a TCP connection or TCP conversation.

The ports 112 of the server 102 are linked to the ports (not shown) of the switch 106 by data links 116. Each of the physical ports 112 is a bi-directional port capable of transceiving packets. That is, each port 112 is capable of receiving packets from the switch 106 port to which it is linked and of transmitting packets to the switch 106 port. In one embodiment, the links 116 are Ethernet links, although links of other physical and data link protocols are contemplated. The client 104 also includes ports (not shown) that are linked to the switch 106. Although not shown, other network devices may be present in the network 100 between the switch 106 and the client 104, such as routers and additional switches. Furthermore, although only a single server 102 and single client 104 are shown for simplicity, the transmit port 112 assignment mechanism described herein may be employed in a network 100 with multiple servers 102 and with each server 102 serving multiple clients 104.

The server 102 includes system memory 124 and a CPU 118 that runs an operating system 122. The operating system 122 includes device drivers for the NIAs 108. Preferably, the operating system 122 includes one or more modules. A module can be implemented in software, hardware or a combination thereof. The operating system 122 includes a protocol stack that implements a networking protocol suite, which may include device drivers. Preferably, the operating system 122 includes one or more modules to implement the TCP/IP protocol suite. Additionally, the operating system 122 includes one or more modules to implement network interface port teaming to enable a plurality of the physical ports 112 to be presented to the client 104 as a virtual network interface port 126. In one embodiment, the virtual network interface port teaming module comprises a teaming device driver. Embodiments are contemplated in which the server 102 employs teaming standards such as IEEE 802.1ax Link Aggregation Control Protocol (LACP) for wired Ethernet or IEEE 802.3ad, although other teaming protocols may be employed. The operating system 122 may include, but is not limited to, Microsoft Windows®, Linux®, Solaris®, HP/UX®, AIX® and other operating systems that support teaming of network interface adapter ports.

As mentioned above, the teaming driver enables the server 102 to present a plurality of the physical ports 112 to the client 104 as a virtual network interface port 126. Specifically, the server 102 presents the virtual network interface port 126 as a single Media Access Control (MAC) address. Preferably, the single MAC address is the unique MAC address of one of the physical ports 112 of the virtual network interface port 126.

In one embodiment, the teaming driver 122 only assigns the transmit port 112 to be the receive port 112 (as described with respect to FIG. 2 and particularly block 212) if certain conditions are met. Otherwise, the teaming driver employs its normal method for assigning the transmit port 112. Specifically, if the TOE 114 cannot perform offloading, then the teaming driver employs a different transmit port assignment method. For example, in one embodiment, if the received packet does not specify the TCP protocol and the IPv4 protocol, then the TOE 114 may not perform offloading. In one embodiment, the different transmit port 112 assignment method is a hash function that attempts to balance the transmit packet load across the physical ports 112 of the virtual port 126. The inputs to the hash function may include, but are not limited to various components of the TCP session, such as the source and destination IP address and the source and destination port numbers. In this context, the source and destination port numbers refer to TCP socket port numbers rather than physical or virtual network interface ports. The TCP socket port number identifies an application or process running on the server 102 or the client 104.

Figure 2:
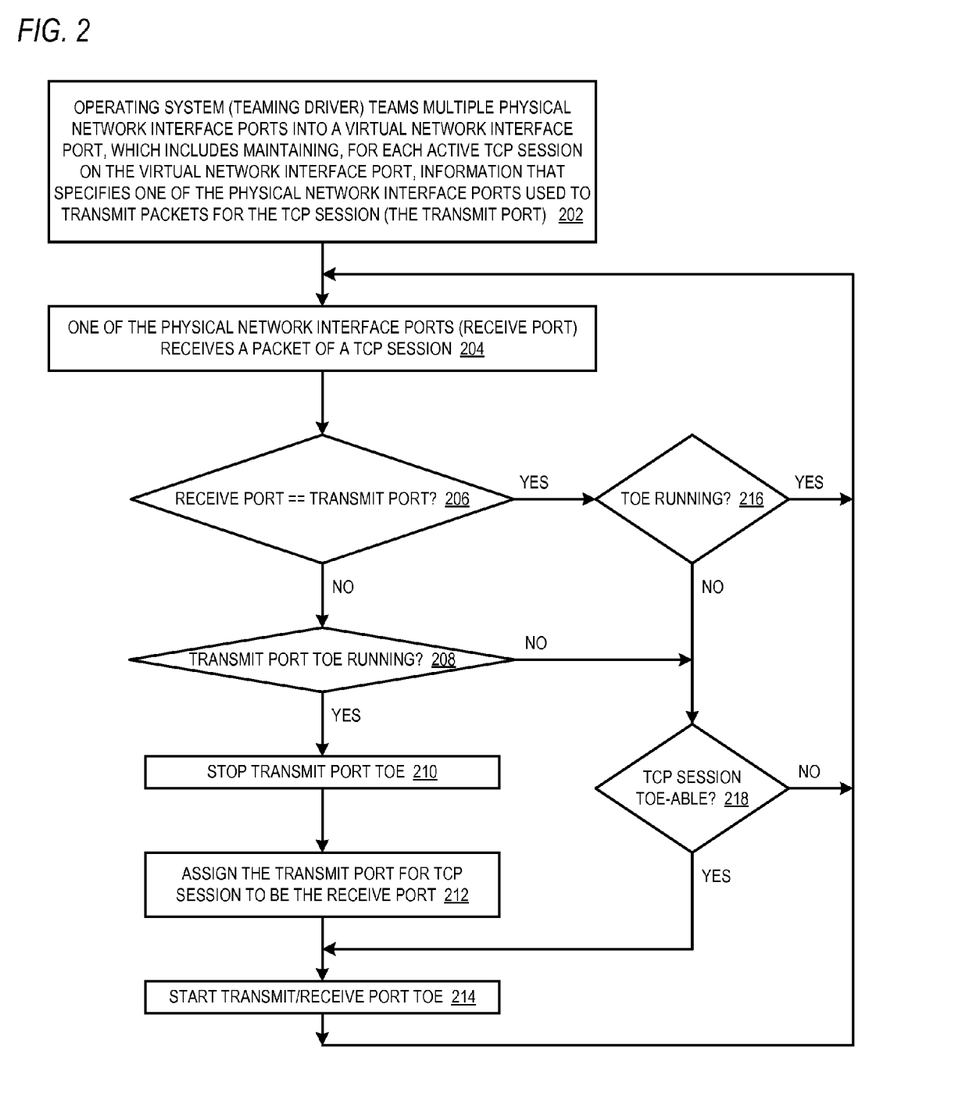
FIG. 2 is a flowchart illustrating operation of the server of FIG. 1 to perform TCP session receive port learning and transmit port assignment according to the present invention.

Referring now to FIG. 2, a flowchart illustrating operation of the server 102 of FIG. 1 according to the present invention is shown. Flow begins at 202.

At block 202, the server 102 operating system 122 of FIG. 1 teams a plurality of the physical network interface ports 112 of the NIAs 108 into the virtual network interface port 126 of FIG. 1 as described above. Preferably, the physical ports 112 to be teamed are selected by the system administrator of the server 102. In one embodiment, a teaming driver of the operating system 122 teams the physical ports 112 into the virtual port 126. Preferably, the teaming driver 122 maintains a table of TCP sessions that are active on the virtual port 126. Some of the TCP sessions are associated with an application running on the client 104 of FIG. 1. Preferably, the table includes an entry for each TCP session. Each entry specifies information for the TCP session, such as the destination MAC address (the MAC address of the client 104 port that is transmitting the packets of the TCP session), the destination IP address (the IP address of the client 104 that is transmitting the packets of the TCP session), the VLAN identifier, the source port number and the destination port number of the TCP session. Each entry also specifies the current transmit port 112 that will be used to transmit packets of the TCP session. The transmit port 112 is the physical port 112 the server 102 uses to transmit packets for the TCP session. When the entry for a TCP session is generated in the table, its transmit port 112 is initially assigned. If the entry is generated in response to a received packet for the TCP session, then the transmit port 112 is assigned to be the receive port 112, which is the physical port 112 that received the packet, as described below with respect to block 204. Otherwise, preferably the initial transmit port 112 assignment is made using a hashing algorithm that attempts to balance the outgoing load among the physical ports 112 of the virtual port 126. However, as described herein, advantageously, as packets of the TCP session are received, the operating system 122 adaptively learns the receive port 112 of the TCP session and assigns the transmit port 112 to be the receive port 112, if necessary. Flow proceeds to block 204.

At block 204, a packet of a TCP session is received by one of the physical ports 112, which is referred to as the receive port 112, of the virtual port 126. The teaming driver 122 is notified of the receive port 112 and the packet. The teaming driver 122 examines the information in the packet that identifies the TCP session and looks up the entry in the table for the TCP session using the information. The teaming driver 122 then ascertains the current transmit port 112 for the TCP session from the looked up entry. Preferably, the teaming driver 122 determines that the received packet belongs to the TCP session if the source MAC address in the packet matches the destination (client) MAC address in the entry, the source IP address in the packet matches the destination (client) IP address in the entry, the source port number in the packet TCP header matches the source port number in the entry, and the destination port number in the packet TCP header matches the destination port number in the entry. Preferably, if no entry exists in the table for the TCP session, e.g., if this is the first packet received for the TCP session, then the teaming driver 122 generates an entry in the table for the new TCP session. In this case, the transmit port 112 value for the TCP session will be invalid and the test at block 206 described below will fail, and flow will eventually proceed to block 212 where the transmit port 112 value for the new TCP session is assigned the receive port 112 value. Flow proceeds to decision block 206.

At decision block 206, the teaming driver 122 determines whether the receive port 112 of which it is notified at block 204 matches the transmit port 112 ascertained at block 204 for the TCP session. If so, flow proceeds to decision block 216. That is, if the receive port 112 and transmit port 112 match, then the teaming driver 122 need not assign the transmit port 112 for the TCP session. However, if the receive port 112 and transmit port 112 do not match, then flow proceeds to decision block 208. Typically, the reason the transmit port 112 does not match the receive port 112 is because the load balancing algorithm in the switch 106 reassigned the output port to be used by the switch 106 to send packets for the TCP session. Another reason may be that the switch 106 deleted one of its ports (e.g., because a cable was unplugged) and subsequently re-added the port (e.g., because the cable was plugged back in), which may cause a reassignment of port indexes within the switch and affect its hashing algorithm that assigns the output ports. Yet another reason, as discussed above, may be that this is the first packet for the TCP session received by the virtual port 126 from the switch 106.

At decision block 208, the operating system 122 determines whether the TOE 114 associated with the transmit port 112 is currently running, that is, offloading the CPU 118 for the TCP session. If so, flow proceeds to block 210; otherwise, flow proceeds to decision block 218.

At block 210, the operating system 122 stops, or disables, the TOE 114 that was offloading the transmit port 112 for the TCP session from offloading the CPU 118. Flow proceeds to block 212.

At block 212, the teaming driver 122 assigns the transmit port 112 for the TCP session to be the receive port 112 that received the packet at block 204. Consequently, subsequent outgoing packets for the TCP session will be transmitted out the transmit port 112, which is now the receive port 112, which advantageously enables the TOE 114 of the transmit/receive port 112 to offload the CPU 118 (after the TOE 114 is started at block 214). In one embodiment, each TCP session entry in the table includes a pointer to a data structure that represents a NIA 108, and the teaming driver 122 assigns the pointer of the TCP session entry to point to the data structure that represents the NIA 108 that includes the receive port 112 that received the packet at block 204. Flow proceeds to block 214.

At block 214, the operating system 122 starts, or enables, the TOE 114 associated with the transmit/receive port 112 that was assigned at block 212 to begin offloading the CPU 118 for the TCP session. Preferably, this involves providing the TCP session state information needed by the TOE 114 to perform the offloading. In one embodiment, the operating system 122, such as Windows, may perform the starting and stopping of the TOE 114 as a coordinated effort between the teaming driver and a Network Driver Interface Specification (NDIS) driver of the operating system 122. Flow returns from block 214 to block 204 to wait for the next received packet.

At decision block 216, the operating system 122 determines whether the TOE 114 associated with the transmit/ receive port 112 is running. If so, flow returns to block 204 to wait for the next received packet; otherwise, flow proceeds to decision block 218.

At decision block 218, the operating system 122 (preferably the network stack) determines whether the TCP session is "TOE-able." In one embodiment, the TCP session is TOE-able if its packets specify the TCP protocol and the IPv4 protocol and the amount of traffic on the session exceeds a predetermined threshold, in addition to the transmit port 112 and the receive port 112 being the same for the TCP session. If the TCP session is TOE-able, flow proceeds to block 214 to start the TOE 114 associated with the transmit/receive port 112 running; otherwise, flow returns to block 204 to wait for the next received packet.

Figure 3:
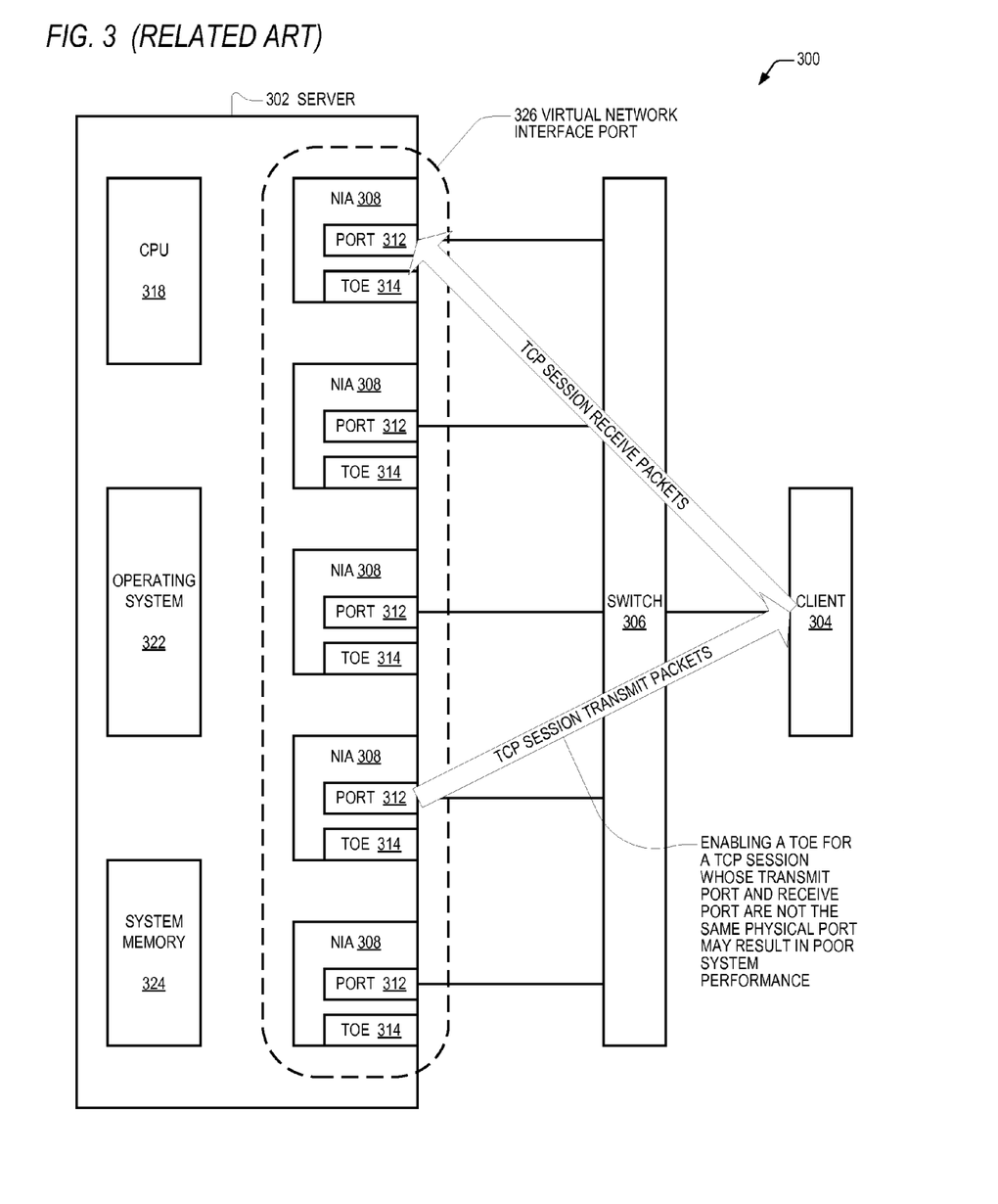
FIG. 3 is a block diagram illustrating the flow of packets in a computer network according to a conventional method.

Referring now to FIG. 3, a block diagram illustrating the flow of packets in a computer network 300 according to a conventional method is shown. The block diagram is similar in many ways to the block diagram of FIG. 1; however, the operating system 322 of FIG. 3 does not include the enhancements to the teaming driver to learn the receive port for a TCP session and assign the transmit port for the TCP session to be the receive port. Consequently, the switch 304 may transmit the packets for a TCP session to a receive port 312 of the virtual network interface port 326 that is different than the transmit port 312 out of which the virtual network interface port 326 transmits packets for the TCP session, as shown. As described above, enabling a TOE 314 for the TCP session when the receive port 312 and the transmit port 312 are different may result in worse system performance than when disabling the TOE.

Figure 4:
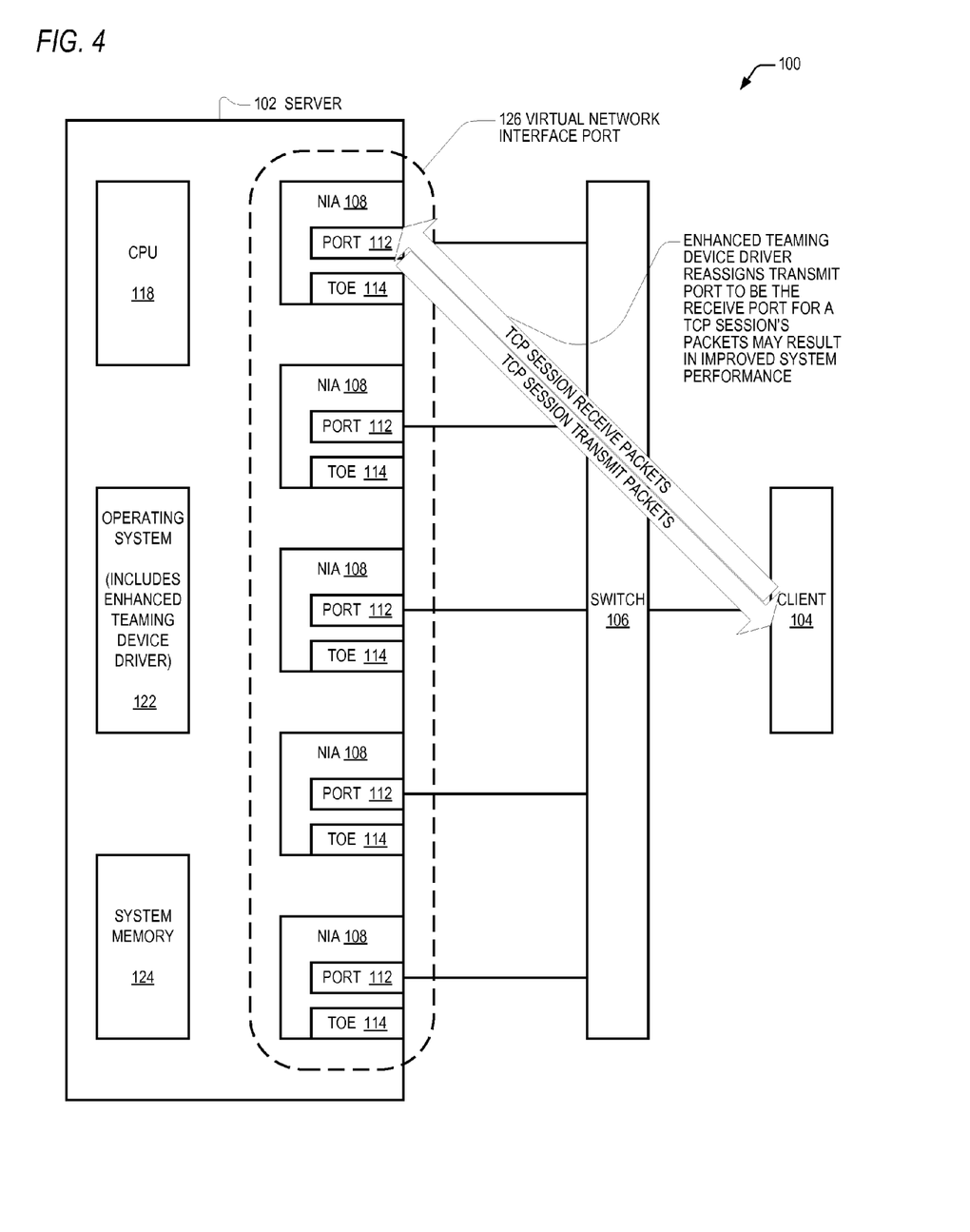
FIG. 4 is a block diagram illustrating the flow of packets in a computer network after TCP session receive port learning and transmit port assignment according to an embodiment of the present invention.

Referring now to FIG. 4, a block diagram illustrating the flow of packets in a computer network 100 after TCP session receive port learning and transmit port assignment according to an embodiment of the present invention is shown. The elements of the network 100 of FIG. 4 are similar to those described above with respect to FIGS. 1 and 2. Advantageously, the assignment of the transmit port 112 for the TCP session to be the receive port 112, as performed at block 212 of FIG. 2, results in improved performance in a server 102 that employs both virtual network interface port teaming and TCP offloading, as depicted in FIG. 4, relative to the conventional method depicted in FIG. 3. The improved performance is realized at least in part because the server 102 does not need to copy the packets within the server 102 memory 124 and/or the local memories of the different NIAs 108 that are receiving the packets and transmitting the packets for the TCP session for the sake of enabling the TOE 114 to offload the CPU 118 because the receive port 112 and the transmit port 112 are on the same NIA 108 with the TOE 114. Thus, the wasted system memory, local I/O bus and/or CPU bandwidth consumed with the packet copying according to the conventional method of FIG. 3 is reduced or eliminated. Another advantage of the embodiments described herein is that they facilitate the teaming of TOEing NIAs 108 of different manufacturers.

Although embodiments have been described in which the transmit port is assigned to be the receive port for a TCP session, embodiments are contemplated in which an offload engine is enabled to offload the system CPU from performing protocol processing for other transport layer protocols, such as, but not limited to, the User Datagram Protocol (UDP), AppleTalk Transaction Protocol (ATP), Reliable Datagram Protocol (RDP), Sequence Packet Exchange (SPX), NetBIOS Frames Protocol (NBX), Internet Small Computer System Interface (iSCSI), Network File System (NFS), Fibre Channel over Ethernet (FCoE), Fibre Channel Protocol (FCP), RDMA over Converged Ethernet (RoCE), Internet Wide Area RDMA Protocol (iWARP), and raw IP.

Furthermore, although embodiments have been described in which a TOE 114 services a single physical port 112, in other embodiments a single TOE 114 may service multiple ports 112 on the NIA 108 and may be capable of offloading the CPU 118 for a TCP session in which packets are being transmitted on one of the ports 112 serviced by the TOE 114 and packets are being received on a different one of the ports 112 serviced by the TOE 114. In this case, the teaming driver 112 need only assign the transmit port 112 to be one of the ports 112 serviced by the TOE 114, which may or may not be the receive port 112 for the TCP session.

A computer usable medium is any of various types of memory devices or storage devices. The term "computer usable medium" is intended to include an installation medium, e.g., a CD-ROM, floppy disk, or tape device; a computer system memory or random access memory such as DRAM, DDR RAM, SRAM, EDO RAM, Rambus RAM, etc.; or a non-volatile memory such as a magnetic media, e.g., a hard drive, optical storage, FLASH memory, or solid-state disk (SSD). The computer usable medium may comprise other types of memory as well, or combinations thereof. In addition, the computer usable medium may be located in a first computer in which the programs are executed, and/or may be located in a second different computer that connects to the first computer over a network, such as the Internet. In the latter instance, the second computer may provide program instructions to the first computer for execution. The term "computer usable medium" may include two or more computer usable mediums that may reside in different locations, e.g., in different computers that are connected over a network.

The term "software" or "software program" is intended to have the full breadth of its ordinary meaning, and includes any type of program instructions, code, script and/or data, or combinations thereof, that may be stored in a computer usable medium and executed by a processor. Exemplary software programs include programs written in text-based programming languages, such as C, C++, C#, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that a computer and/or software program may implement various embodiments described herein. A software program may be stored as program instructions on a computer usable medium.

While various embodiments of the present invention have been described herein, it should be understood that they have been presented by way of example, and not limitation. It will be apparent to persons skilled in the relevant project management arts that various changes in form and detail can be made therein without departing from the scope of the invention. For example, software can enable the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known non-transitory computer usable medium such as magnetic tape, semiconductor, magnetic disk, or optical disc (e.g., CD-ROM, DVD-ROM, etc.), a network, or wire line, or other communications medium. Embodiments of the apparatus and method described herein may be included in an integrated circuit.

Additionally, the apparatus and methods described herein may be embodied as a combination of hardware and software. Thus, the present invention should not be limited by any of the exemplary embodiments described herein, but should be defined only in accordance with the following claims and their equivalents. Finally, those skilled in the art should appreciate that they can readily use the disclosed conception and specific embodiments as a basis for designing or modifying other structures for carrying out the same purposes of the present invention without departing from the scope of the invention as defined by the appended claims.

I claim:

1. A method, comprising:
   teaming together a plurality of physical network interface ports of a computing system to appear as a single virtual network interface port to a switch having a corresponding plurality of ports to which the plurality of physical ports are linked;
   determining a receive port upon which a packet of a TCP session was received, wherein the receive port is one of the plurality of physical network interface ports of the virtual network interface port; and
   assigning a transmit port to be the receive port, wherein the transmit port is used by the computing system to transmit packets of the TCP session;
   wherein said assigning is performed prior to a Transmission Control Protocol (TCP) offload engine (TOE) of the computing system being enabled to offload from a CPU of the computing system processing of packets of the TCP session transceived on the assigned transmit/receive port.

2. The method of claim 1, further comprising:
   receiving a second packet of the TCP session, after the TOE is enabled;
   detecting the second packet was received on a second receive port of the plurality of physical ports different from the assigned transmit/receive port; and
   assigning the transmit port for the TCP session to be the second receive port in response to said detecting the second packet was received on the second receive port that was different from the assigned transmit/receive port.

3. The method of claim 2, wherein said assigning the transmit port for the TCP session to be the second receive port is performed prior to a second TOE of the computing system being enabled to offload from the CPU processing of packets of the TCP session transceived on the second receive/transmit port, wherein the second TOE is different from the first TOE.

4. The method of claim 1, wherein the plurality of physical network interface ports are teamed together to appear as the single virtual network interface port to the switch according to the Link Aggregation Control Protocol (LACP) standard.

5. The method of claim 1, wherein the plurality of physical network interface ports are teamed together to appear as the single virtual network interface port to the switch according to the IEEE 802.3ad teaming protocol standard.

6. The method of claim 1, wherein the plurality of physical network interface ports comprise Ethernet ports.

7. The method of claim 1, wherein the enabled TOE is included on a same network interface adapter as the assigned transmit/receive port.

8. One or more modules, comprising:
   a first portion of the one or more modules, configured to team together a plurality of physical network interface ports of a computing system to appear as a single virtual network interface port to a switch having a corresponding plurality of ports to which the plurality of physical ports are linked;
   a second portion of the one or more modules, configured to determine a receive port upon which a packet of a TCP session was received, wherein the receive port is one of the plurality of physical network interface ports of the virtual network interface port; and
   a third portion of the one or more modules, configured to assign a transmit port to be the receive port, wherein the transmit port is used by the computing system to transmit packets of the TCP session;
   wherein the third portion assigns the transmit port to be the receive port prior to a Transmission Control Protocol (TCP) offload engine (TOE) of the computing system being enabled to offload from a CPU of the computing system processing of packets of the TCP session transceived on the assigned transmit/receive port.

9. The one or more modules of claim 8, further comprising:
   a fourth portion of the one or more modules, configured to receive a second packet of the TCP session, after the TOE is enabled;
   a fifth portion of the one or more modules, configured to detect the second packet was received on a second receive port of the plurality of physical ports different from the assigned transmit/receive port; and
   a sixth portion of the one or more modules, configured to assign the transmit port for the TCP session to be the second receive port in response to the fourth portion detecting the second packet was received on the second receive port that was different from the assigned transmit/receive port.

10. The one or more modules of claim 9, wherein the sixth portion of the one or more modules assigns the transmit port for the TCP session to be the second receive port prior to a second TOE of the computing system being enabled to offload from the CPU processing of packets of the TCP session transceived on the second receive/transmit port, wherein the second TOE is different from the first TOE.

11. The one or more modules of claim 8, wherein the first portion of the one or more modules is configured to team together the plurality of physical network interface ports to appear as the single virtual network interface port to the switch according to the Link Aggregation Control Protocol (LACP) standard.

12. The one or more modules of claim 8, wherein the first portion of the one or more modules is configured to team together the plurality of physical network interface ports to appear as the single virtual network interface port to the switch according to the IEEE 802.3ad teaming protocol standard.

13. The one or more modules of claim 8, wherein the plurality of physical network interface ports comprise Ethernet ports.

14. The one or more modules of claim 8, wherein the enabled TOE is included on a same network interface adapter as the assigned transmit/receive port.

15. A computer program product encoded in at least one non-transitory computer usable medium, the computer program product comprising:
   computer usable program code embodied in said medium, the computer usable program code comprising:
   first program code for teaming together a plurality of physical network interface ports of a computing system to appear as a single virtual network interface port to a switch having a corresponding plurality of ports to which the plurality of physical ports are linked;

second program code for determining a receive port upon which a packet of a TCP session was received, wherein the receive port is one of the plurality of physical network interface ports of the virtual network interface port; and third program code for assigning a transmit port to be the receive port, wherein the transmit port is used by the computing system to transmit packets of the TCP session;

wherein the third program code assigns the transmit port to be the receive port prior to a Transmission Control Protocol (TCP) offload engine (TOE) of the computing system being enabled to offload from a CPU of the computing system processing of packets of the TCP session transceived on the assigned transmit/receive port.

16. The computer program product of claim 15, the computer usable program code further comprising:

fourth program code for receiving a second packet of the TCP session, after the TOE is enabled;

fifth program code for detecting the second packet was received on a second receive port of the plurality of physical ports different from the assigned transmit/receive port; and sixth program code for assigning the transmit port for the TCP session to be the second receive port in response to the fifth program code detecting the second packet was received on the second receive port that was different from the assigned transmit/receive port.

17. The computer program product of claim 16, wherein the sixth program code assigns the transmit port for the TCP session to be the second receive port prior to a second TOE of the computing system being enabled to offload from the CPU processing of packets of the TCP session transceived on the second receive/transmit port, wherein the second TOE is different from the first TOE.

18. The computer program product of claim 15, wherein the first program code is configured to team together the plurality of physical network interface ports to appear as the single virtual network interface port to the switch according to the Link Aggregation Control Protocol (LACP) standard.

19. The computer program product of claim 15, wherein the first program code is configured to team together the plurality of physical network interface ports to appear as the single virtual network interface port to the switch according to the IEEE 802.3ad teaming protocol standard.

20. The computer program product of claim 19, wherein the at least one non-transitory computer usable medium is selected from the set of a disk, tape, or other magnetic, optical, or electronic storage medium and a network or wire line communications medium.

* * * * *